(12) United States Patent
Reppel

(10) Patent No.: US 6,523,594 B1
(45) Date of Patent: Feb. 25, 2003

(54) TIRE RETREADING PLANT

(75) Inventor: Emil Willy Reppel, Falkenberg (SE)

(73) Assignee: Recamic S.A., Givisiez (CH)

( * ) Notice: Subject to any disclaimer, the term of this patent is extended or adjusted under 35 U.S.C. 154(b) by 15 days.

(21) Appl. No.: 09/704,181

(22) Filed: Nov. 1, 2000

Related U.S. Application Data

(63) Continuation of application No. PCT/EP99/02911, filed on Apr. 29, 1999.

(30) Foreign Application Priority Data

May 5, 1998 (FR) .............................................. 98 05994

(51) Int. Cl.[7] .......................... B29D 30/54; B29C 31/04
(52) U.S. Cl. ................. 156/396; 156/394.1; 156/406.2; 156/909; 425/18; 425/38
(58) Field of Search ........................ 156/96, 111, 394.1, 156/909, 406.2, 396; 425/18, 17, 38; 29/429, 430

(56) References Cited

U.S. PATENT DOCUMENTS

| 4,126,506 A | 11/1978 | Maroson |
| 4,490,197 A | 12/1984 | Bajer |
| 5,221,389 A * | 6/1993 | Majewski .................... 156/96 |

FOREIGN PATENT DOCUMENTS

| EP | 0055237 | 6/1982 |
| EP | 0086766 | 8/1983 |

* cited by examiner

*Primary Examiner*—Geoffrey L. Knable
(74) *Attorney, Agent, or Firm*—Baker Botts L.L.P.

(57) ABSTRACT

A recapping shop concluding a plurality of work stations for preparing tires to be recapped, an autoclave having a horizontal axis for vulcanizing the new treads, a first transport system for transferring the tires between the various stations and for storing them and a second transport system for transferring the tires into the autoclave, out of it and for storing them, characterized in that the first and second transport systems have a common transfer and storage structure.

5 Claims, 6 Drawing Sheets

TIRE RETREADING PLANT

This is a continuation of PCT/EP99/02911, filed Apr. 29, 1999, published in French on Nov. 11, 1999 as WO99/56945, claiming priority to French Patent Application No. 98/05994, filed May 5, 1998.

BACKGROUND OF THE INVENTION

The present invention relates to a tire recapping shop; it relates more precisely to an improved shop for performing recapping in a non-industrial zone, for example in developing countries. This shop may be used by a single operator; he uses simple, robust machines, and consequently the manufacturing, maintenance and use costs of such a simplified shop are particularly low.

The process implemented in the invention is of the type comprising stations for detreading the used tires, for scraping the carcass, for laying the new tread, or rolling it on to the carcass, and a vulcanization autoclave for the tires which have been provided with their new tread.

Generally, the transfers of tires between these different stations on one hand, then into the autoclave and out of it on the other hand, as well as the various intermediate storage operations, are effected by conveyors of greater or lesser bulk and complexity. An example of this type of installation is described in European Patent 086 766.

The present invention is directed precisely at simplifying the conveyors used hitherto.

SUMMARY OF THE INVENTION

According to the invention, a recapping shop comprising a certain number of work stations for preparing the tires to be recapped, an autoclave having a horizontal axis for vulcanizing the new treads, first means for transferring the tires between the various stations and for storing them and second means for transferring the tires into the autoclave, out of it and for storing them, is characterized in that the first and second transfer means comprise a common transfer and storage structure.

Preferably, the first transfer means comprise a first endless loop of a monorail transporter and a crane, the boom of which makes it possible to reach all the work stations arranged in a circle around the crane and the second transfer means comprise a second endless loop, a branch of said monorail transporter and the crane, said branch entering into the autoclave, the common transfer and storage structure being formed of a branch common to the two endless loops of said monorail transporter and said crane.

Advantageously, the two endless loops have an elongated form to facilitate intermediate storage of tires in batches. The foot of the crane is preferably mounted inside the second endless loop of the monorail transporter.

DESCRIPTION OF THE DRAWINGS

An example of embodiment of the invention, which is given in non-limitative manner, will be described in detail, with reference to the appended drawing, in which.

DESCRIPTION OF PREFERRED EMBODIMENTS

Figure 1:
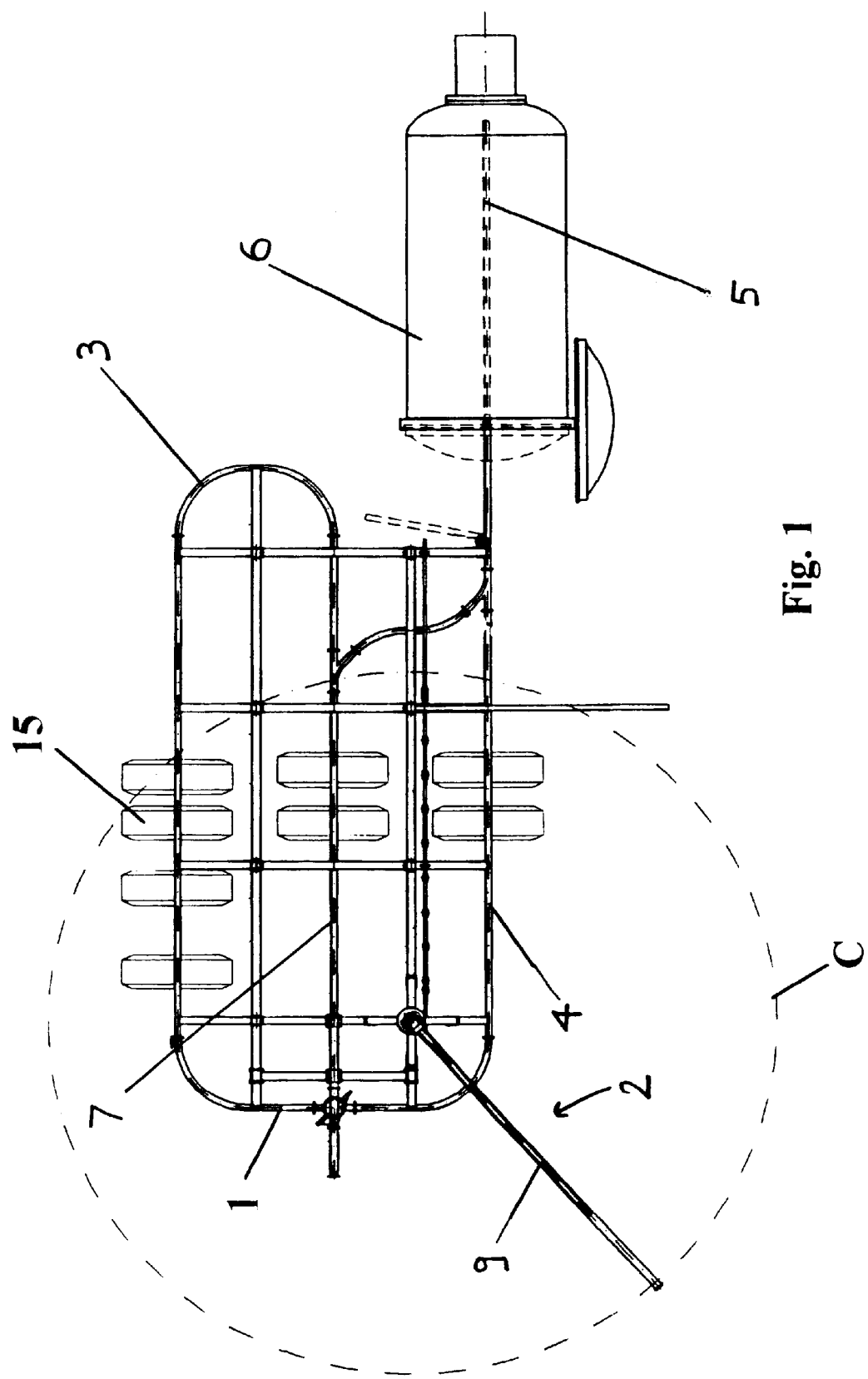
FIG. 1 is a diagrammatic top view of the recapping shop.

FIG. 1 shows diagrammatically the transfer means of a recapping shop according to the invention. These transfer means comprise a monorail transporter 1 and a single crane 2. The monorail transporter 1 comprises a first elongated endless loop 3 and a second endless loop 4 with a rectilinear branch 5 extending into the autoclave 6 having a horizontal axis. These two endless loops 3 and 4 have a common branch 7. The support or foot 8 of the crane 2 is mounted inside the second endless loop 4 of the monorail transporter 1.

Figure 2:
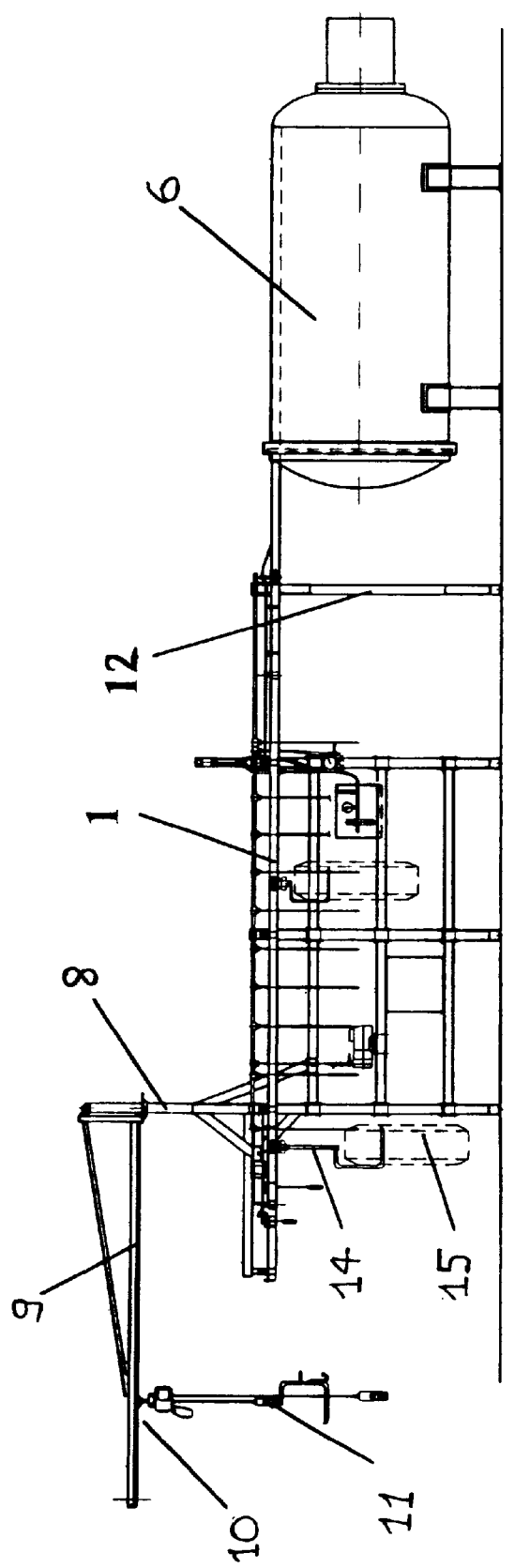
FIGS. 2 and 3 are a diagrammatic elevational and side views, respectively, of the same shop.
Figure 3:
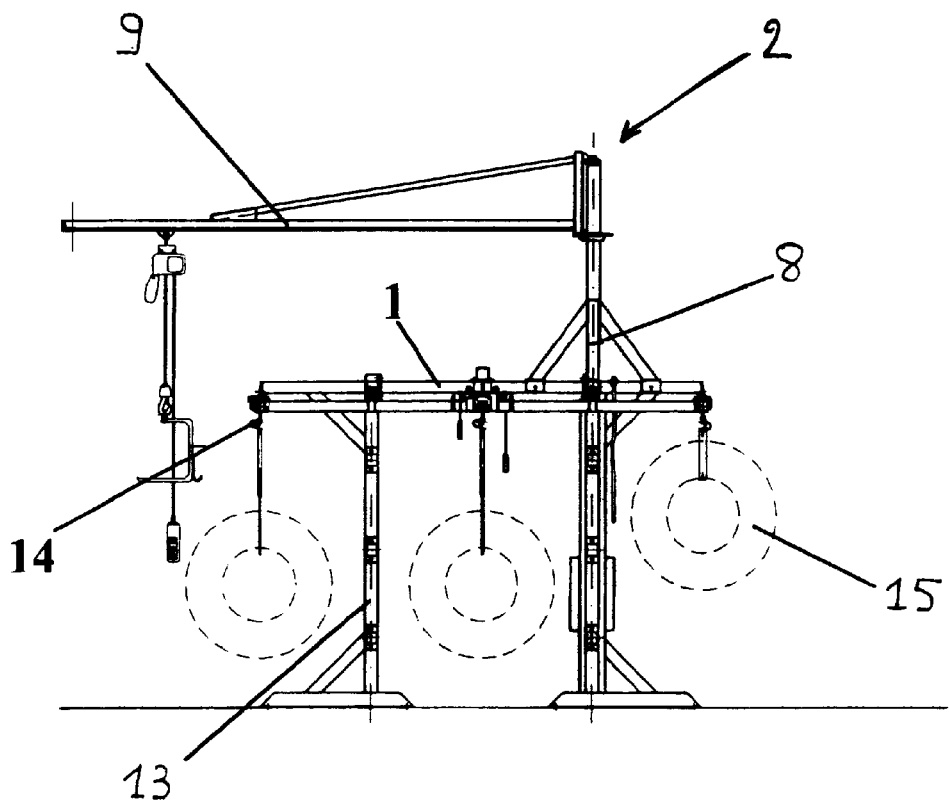

FIGS. 2 and 3 show the crane 2. The boom 9 thereof, which is equipped with a trolley 10 and a hoist 11, makes it possible—as will be described further below—to reach all the work stations arranged around the crane 2 in a circle C (shown in broken lines in FIGS. 1, 5 and 6).

In known manner, the monorail 1 is fixed to rigid posts, such as 12 and 13, and is equipped with brackets such as 14, for transporting tires 15, etc.

Figure 4:
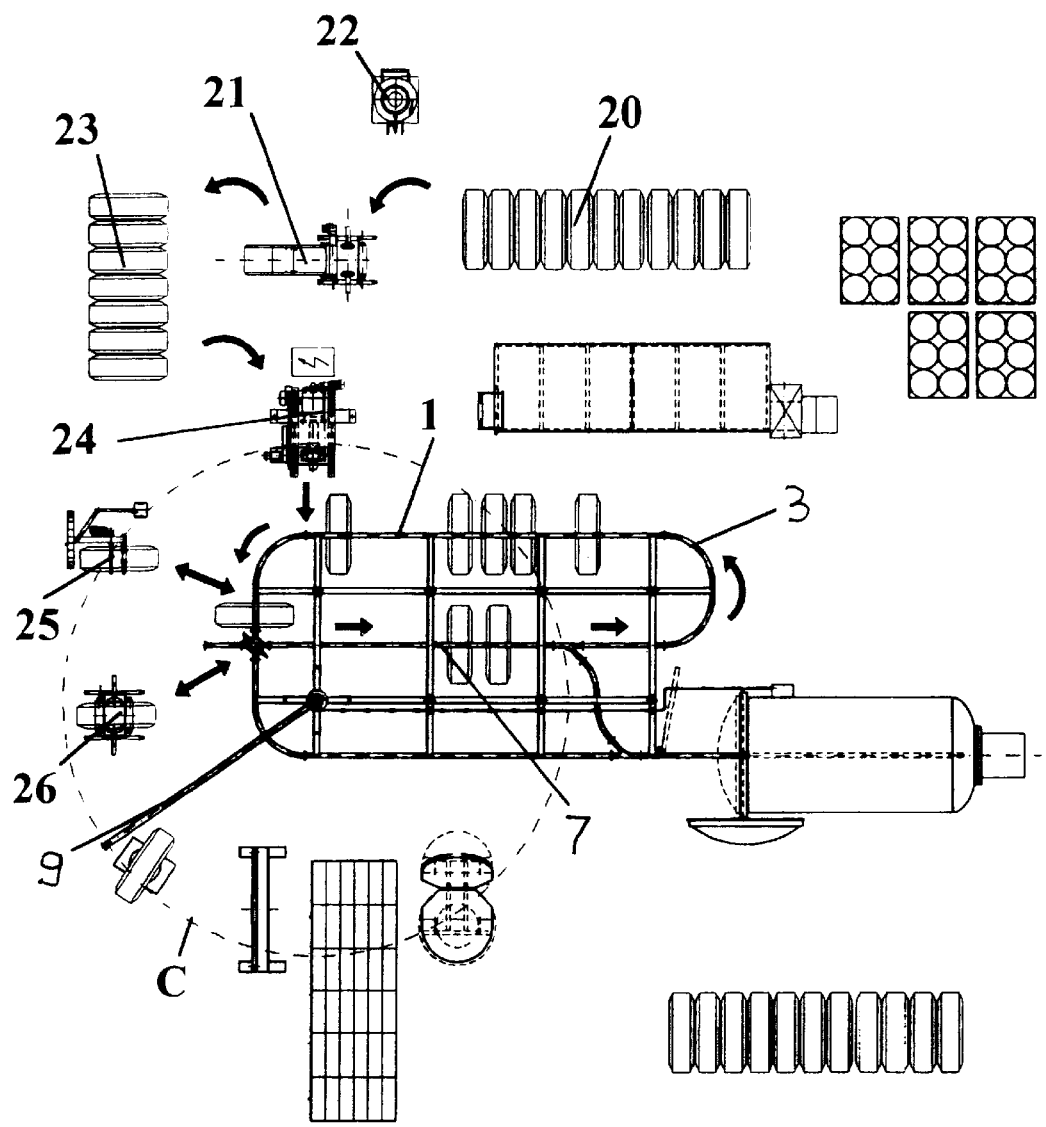
FIGS. 4, 5 and 6 are simplified top views of the same shop, showing the transfers of the tires during the successive phases; in these figures, only the references necessary to explain each phase of operation have been shown.
Figure 5:
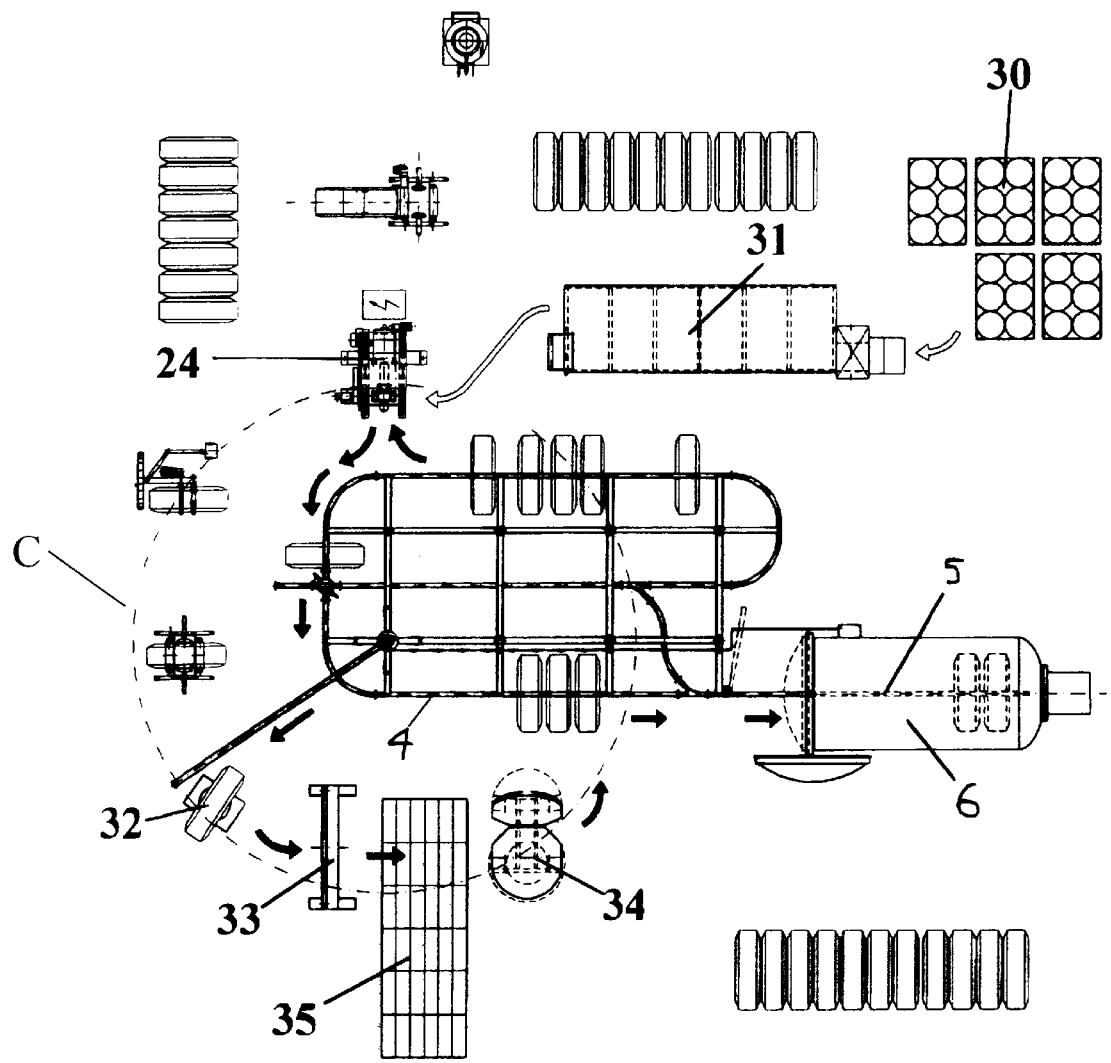
Figure 6:
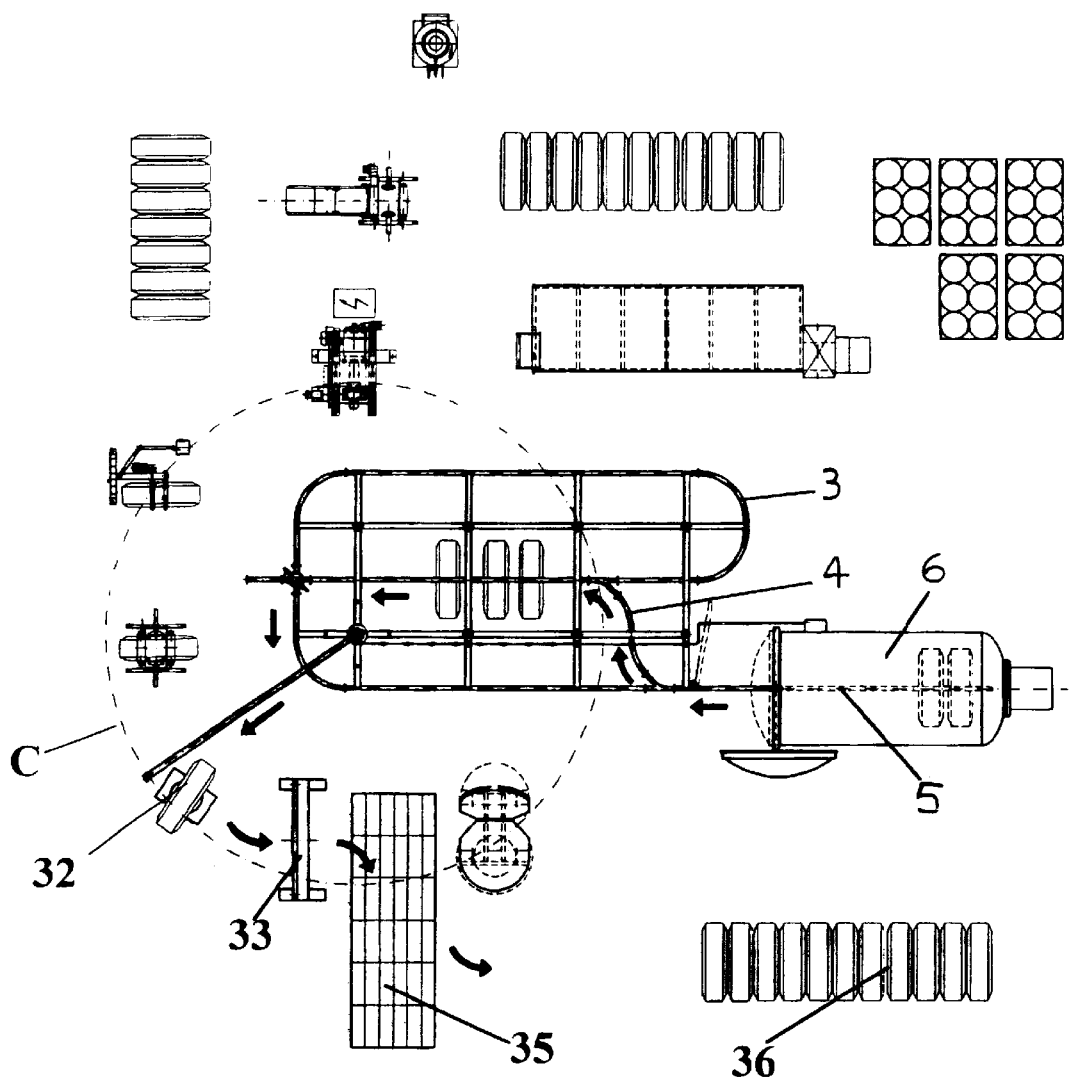

With reference to FIGS. 4, 5 and 6, the operation of this shop will now be described and the role of the different stations specified.

FIG. 4 relates to the phase of receiving and detreading the used tires which are to be recapped.

On arrival, the worn tires to be recapped are stored at 20, then inspected at 21 and cleaned at 22 using an aspirator; they are then stored at 23 before being mounted on the detreading machine 24. Advantageously, this machine is of a type which makes it possible to effect both the detreading and the dressing with the new tread. In this first stage, therefore, the worn tread is removed by scraping the crown of the tire to be recapped.

From this station, the tires are transferred by the crane, the boom 9 of which sweeps the circle C, and are stored beneath the monorail 1. The station 25, which makes it possible to turn the tires, facilitates external repairs, for example on a crown reinforcement ply or damage to the sidewall, whereas the station 26 is an internal repair station. The tires thus prepared then return to the station 25 for application of rubber solution before the new tread is laid, then they are stored on the first endless loop 3 of the monorail transporter 1.

FIG. 5 relates to the phase of recapping proper: the new treads, stored at 30, are brought at 31 to be cut to the desired length and sized, then mounted on a tire using the machine 24 already mentioned. After dressing with the new tread, each tire is brought to the station 32 for the curing rim and the internal curing membrane or an internal chamber (in the case of textile carcasses) to be put in position; at the station 33 the tires are inserted into an external envelope by an expander. The object of the station 34 is to tip the tires in order to mount the external envelope and to draw the air between the tire and the envelope in the case of radial carcasses; a rubber mat 35 arranged on the ground protects the external curing membranes from any risk of puncture.

The tires thus prepared are grouped on the outer branch of the second loop 4 of the monorail transporter 1 in batches of 5 or 10, for example, depending on the capacity of the autoclave 6, into which they are then introduced, guided on the branch 5 of the loop 4 of the monorail.

FIG. 6 relates to the phase of unloading of the recapped tires: after vulcanization in the autoclave 6, the recapped tires are brought, still in batches, from the branch 5 to the common branch 7 of the monorail, for intermediate storage again.

From there, they are taken up again at the station 33 for removing the outer envelope. In the case of radial tires, the chambers or the internal envelopes are also removed in the protected zone 35.

Finally, after a last check, the recapped tires, which are ready to be shipped, are unloaded and taken to 36.

It can be seen that the invention makes it possible to produce a very compact installation, all the costs of which are reduced, and the space taken up on the ground of which is minimal.

I claim:

1. A tire recapping shop comprising:
   (1) a plurality of work stations for preparing tires to be recapped;
   (2) an autoclave having a horizontal axis for vulcanizing new treads of tires;
   (3) a monorail transporter for transporting the tires and having first and second endless loops which share a common branch, said second endless loop having a second branch extending into said autoclave;
   (4) a first means, including the first endless loop of said monorail transporter, for transferring the tires between workstations during preparation of the tires for vulcanization and for storing the tires;
   (5) a second means, including the second endless loop of said monorail transporter and said second branch thereof, for transferring the tires into and out of said autoclave and for storing the tires.

2. The shop according to claim 1, wherein the first and second means include a single crane having a boom, where the boom allows for movement between the plurality of workstations arranged in a circle around the crane.

3. The shop according to claim 1, wherein the first and the second endless loops have an elongated form to facilitate intermediate storage of tires in batches.

4. The shop according to claim 2, wherein the crane comprises a support mounted inside the second endless loop.

5. The shop according to claim 1, wherein the tires are stored on the common branch after removal from the autoclave.

* * * * *